Aug. 3, 1937.  E. S. SODERBERG  2,088,671
SEMAPHORE
Filed Oct. 20, 1936
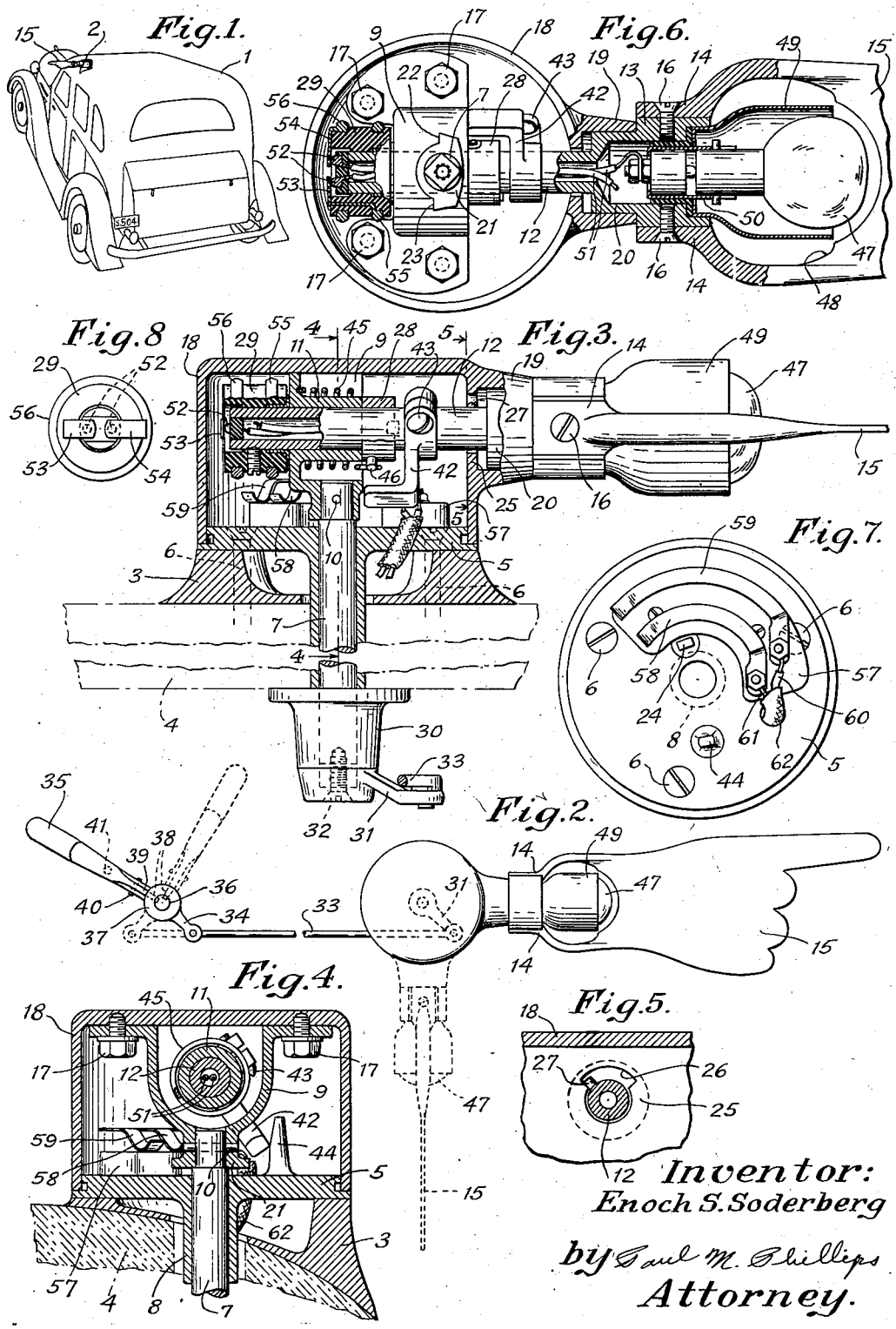
Inventor:
Enoch S. Soderberg
by Paul M. Phillips
Attorney.

Patented Aug. 3, 1937

2,088,671

UNITED STATES PATENT OFFICE 2,088,671

SEMAPHORE

Enoch S. Soderberg, Windsor, Conn.

Application October 20, 1936, Serial No. 106,597

1 Claim. (Cl. 116—54)

This invention relates to semaphore signaling means for automotive vehicles, and more particularly to a means such as a semaphore or other suitable indicating member which is preferably disposed substantially in a single plane and by which a vehicle operator may indicate to persons both in front and in rear of his vehicle his intention to make a turn, such, for example, as a left turn.

Among the objects of the invention are to provide apparatus of the character above described which will be simple in operation, having but a single operating means accessible to the vehicle operator, and which will clearly indicate the intention of such operator to turn his vehicle in one direction or the other, or to stop the vehicle, the indicating means being easily visible both from in front and in rear of the vehicle.

A further object of the invention comprises the provision of apparatus of the character generally set forth above by which a semaphore indicating member may be held either in an inconspicuous position extending generally rearwardly from its support adjacent to the roof of the associated vehicle and being disposed in a substantially horizontal plane parallel to the direction of movement of the vehicle or in a conspicuous position in which the semaphore member extends laterally from the vehicle and is disposed in a substantially vertical plane.

A further object of the invention is to provide apparatus of the character set forth with which there is associated an illuminating means, such as an electric light, accompanied by automatic means responsive to movement of the semaphore means towards its conspicuous position for closing a circuit to the electric light to insure illumination of the semaphore means during all the time it is at or near its conspicuous position.

Further and more detailed objects of the present invention will become apparent from the following description of one embodiment thereof and from the appended claim, when taken in connection with the accompanying drawing, in which:

Figure 1 is a perspective view illustrating the application of my improved semaphore device to an automobile;

Fig. 2 is a more or less diagrammatic plan view of the movable parts of the device as seen from above, showing the inconspicuous position of the parts in full lines and the conspicuous position thereof in dotted lines;

Fig. 3 is a view principally in central vertical section of the operating mechanism of the device, the associated portion of the automobile being indicated in dot and dash lines;

Fig. 4 is a view taken substantially in vertical section on the line 4—4 of Fig. 3;

Fig. 5 is a fragmentary view substantially in vertical section on the line 5—5 of Fig. 3;

Fig. 6 is a bottom plan view with parts broken away and in horizontal section of the movable portion of the device shown in Fig. 3;

Fig. 7 is a plan view of the stationary parts of the device, being the parts shown in Fig. 3 with the parts shown in Fig. 6 removed; and Fig. 8 is a view of the left hand end of the horizontal shaft and its associated means as would be seen looking from the left in Fig. 3 and with the cover portion removed.

In Fig. 1, I have shown an automobile 1 which is provided with a semaphore device according to my invention, this device being generally indicated by the numeral 2 in that figure. I prefer to mount my device upon or adjacent to the roof of an automotive vehicle, so that it will be conspicuous to persons both in front and in rear thereof. As shown best in Figs. 3 and 4, a base member 3 is suitably mounted upon the roof 4 of an automotive vehicle. This base has associated therewith a plate member 5 and may be secured in position in any desired manner, as for example by one or more screws 6.

Extending through a suitable aperture centrally of the base 3 and the plate member 5 is a vertical shaft 7, which may be journaled as shown in a depending sleeve portion 8 of the member 5. At its upper end, the shaft 7 has secured thereto a supporting member 9, the member 9 being illustrated as pinned at 10 to the shaft 7. The member 9 is formed with a horizontal sleeve bearing portion 11 in which is journaled a horizontally extending hollow shaft 12. One end of the shaft 12 is enlarged, as best seen in Fig. 6, at 13 and carries secured thereto the terminal portions 14 of a semaphore indicating member 15, the portions 14 being secured to the enlargement 13 of the shaft 12 as shown, by screw bolts 16.

The supporting member 9 also has secured thereto, as by bolts 17, a cover member 18, the lower peripheral flange portion of which is circular and fits into the rabbeted periphery of the plate member 5. The cover member 18 is provided with a suitable aperture for the passage of the shaft 12 and with a bearing portion 19 serving as a support for an intermediate diameter portion 20 of the shaft 12, as best seen in Fig. 6.

The lower portion of the supporting member 9 which is pinned to the shaft 7 is enlarged and may be formed as shown at 21, Fig. 6, to provide shoulders 22 and 23, which cooperate with a stop member 24, Fig. 7, to limit the rotation of the member 9 and shaft 7 to an arc of approximately 90°, between a position in which the shaft 12 extends generally rearwardly from the axis of the shaft 7 and a position in which the former shaft extends laterally from such axis.

Stop means may also be provided for limiting the rotational movement of the shaft 12. For this purpose the cover member 18 is formed with a web portion 25, Figs. 3 and 5, which has a cut-out sector 26. In this sector the shaft 12 is provided with a lug 27, which limits the rotation of the shaft 12 to the angular length of the cut-out sector 26, which as shown permits a 90° rotation of the shaft 12.

The shaft 12 is prevented from axial movement in respect to the bearing portion 11 of the support 9 by a collar 28, Figs. 3 and 6, suitably secured to the shaft, this collar bearing against the right hand end of the bearing portion 11 as seen in Fig. 3, and by an annular collar member 29, which is preferably of insulating material for purposes hereinafter to be set forth and which bears against the left hand end of this bearing portion 11.

Means are provided for imparting rotative movement to the shaft 7, which in turn is transmitted to the shaft 12 both for rotating it about the vertical axis of the shaft 7 and by a mechanical interconnecting means later to be described for rotating it about its own horizontal axis. For this purpose a suitable handle may be associated with the lower end of the shaft 7. I have, however, shown a means by which this shaft may be rotated from a distance, preferably from a suitable point accessible to the vehicle operator. As shown, the lower end of the shaft 7 extends through a suitable fitting 30, which may be secured in any desired manner to the interior of the car surrounding the shaft. The lower end of the shaft 7 is squared, as indicated in Fig. 6, and to this squared end there may be secured a crank arm 31, as by a screw bolt 32. The crank arm 31 may be connected by a pivoted link 33, Figs. 2 and 3, to one end of a lever 34 pivoted intermediate its ends and having its opposite end provided with a suitable handle 35. The lever 34 is pivoted about a vertical pintle 36 suitably secured to a portion of the vehicle at a desired position, so that the handle 35 is accessible to the vehicle operator. The pintle 36 may have associated therewith a stationary collar member 37, which is provided with one or more slots 38 with which a latch member 39 associated with the handle 35 may engage. The latch member 39 may be pivoted at 40 to the handle 35 and provided with a spring 41 tending to engage it in latching contact with one or the other of the slots 38. Thus the shaft 7 may be moved to and latched in either of two positions as shown by the full and dotted lines in Fig. 2.

Means are provided for causing the rotation of the shaft 12 about its own horizontal axis in response to rotation of the shaft 7. For this purpose, the shaft 12 is provided with a laterally extending arm 42 secured thereto as by a split collar and a set screw 43. The lower end of the arm 42 is bent laterally as shown, and is adapted to engage a fixed detent 44 secured to or integral with the base plate 5, as shown in Figs. 4 and 7. Thus when the shaft 7 is moved clockwise, as seen in Fig. 7, to move the parts carried thereby including the semaphore member 15 from its inconspicuous to its conspicuous position, the lower end of the arm 42 will engage the detent 44 to rotate the shaft 12 and thus to rotate the semaphore member 15 from a horizontal position to a vertical plane position, as seen by a comparison of the full and dotted line portions of Fig. 2.

Means are provided for resiliently urging the semaphore member 15 towards its inconspicuous position. For this purpose, a spiral coil spring 45 is provided surrounding the bearing portion 11 of the member 9 and having its left-hand end, as seen in Fig. 3, secured thereto. The right-hand end of this spring may be suitably secured to the shaft 12 as by providing the collar 28 with a suitable detent 46 about which the free end of the spring may be hooked. When the semaphore member 15 is moved from its inconspicuous to its conspicuous position, the spring 45 will be more tightly coiled, so that it will tend to return the semaphore member to its inconspicuous position once the latch 39 (Fig. 2) is released by tending to rotate the shaft 12, which in turn through engagement of the arm 42 and the detent 44 will tend to rotate the shaft 7 and parts carried thereby.

Means are preferably provided for illuminating the semaphore member 15. For this purpose, I have illustrated an electric bulb 47, which is preferably mounted axially of the shaft 12 in an aperture 48 provided therefor in the semaphore member 15. Surrounding the bulb 47 is a light shield 49, which is suitably secured to the enlargement 13 of the shaft 12. In this enlargement there is positioned a conventional bayonet-type socket generally indicated at 50, which as shown is of the two-contact type and has leading thereto two lead wires 51. It will be understood, of course, that if desired a single contact type of socket and bulb may be used and one side of the socket grounded in the conventional manner.

The wires 51 extend as shown to a pair of contacts 52, Figs. 3, 6, and 8, which are suitably mounted in a transversely extending member of suitable insulating material. The contacts 52 engage connecting members 53 and 54, which connect them respectively with annular rings 55 and 56 as best shown in Figs. 6 and 8. The rings 55 and 56 are suitably mounted in the insulating collar 29 as shown.

It is desired that means be provided for closing the circuit to the bulb 47 only when the semaphore member is at least a predetermined distance away from its inconspicuous position. For this purpose there is provided on the base plate 5 an insulating support 57, which has associated therewith a pair of semi-circular stationary spring contacts 58 and 59 in alignment to be engaged by the rings 55 and 56 respectively. As shown, the both ends of each of the contacts 58 and 59 are bent down and engage the insulating support 57, while the middle portions extend upwardly and are adapted to be in resilient engagement with the rings 55 and 56. However, the rings 55 and 56 will not engage the contact members 58 and 59 until the shaft 7 has rotated through a certain predetermined portion of its path of movement, after which there will be continuous contact, so that the bulb 47 will be lighted only after the semaphore member 15 has been moved more than a predetermined distance away from its inconspicuous position toward its conspicuous position. Suitable means including wires 60 and 61, Fig.

7, included in an insulating cable 62 may be provided for conducting current from a suitable source such as the automobile power system to the device.

Thus, it will be seen that I have provided a simple, relatively inexpensive and fool-proof device for the purposes described, accessible for easy operation by a vehicle operator, and so positioned and of such character as to be easily seen by persons either before or behind the vehicle so equipped.

I appreciate that certain changes may be made in the practical embodiment of my invention, without departing from the spirit thereof, and I do not wish to be limited, therefore, except by the scope of the appended claim.

I claim:

A semaphore signal for automotive vehicles, comprising a base portion adapted to be mounted on the roof of a vehicle, a vertical shaft extending through said base portion, a supporting means mounted on the upper end of said shaft, a horizontal shaft rotatably mounted in said supporting means, a semaphore indicating member secured to said horizontal shaft, an arm on said horizontal shaft, a detent on said base portion adapted to be engaged by said arm and so arranged that rotation of said supporting means causes simultaneous rotation of said horizontal shaft in respect to said supporting member, means limiting the rotation of said horizontal and vertical shafts to substantially 90° each, a coil spring connected between said horizontal shaft and said supporting means and so arranged as to urge the movable parts of the device to a position such that the semaphore member is in an inconspicuous position extending rearwardly from the axis of said vertical shaft and is disposed in a substantially horizontal plane, a handle accessible to the vehicle operator, means interconnecting said handle and said vertical shaft so that movement of said handle will cause movement of the vertical shaft which in turn will cause movement of said semaphore member from its inconspicuous position to a conspicuous position in which it extends laterally from the vehicle and is disposed in a substantially vertical plane, and means associated with said handle for latching it to hold said semaphore member selectively in its conspicuous or inconspicuous positions.

ENOCH S. SODERBERG.